Figure 1:
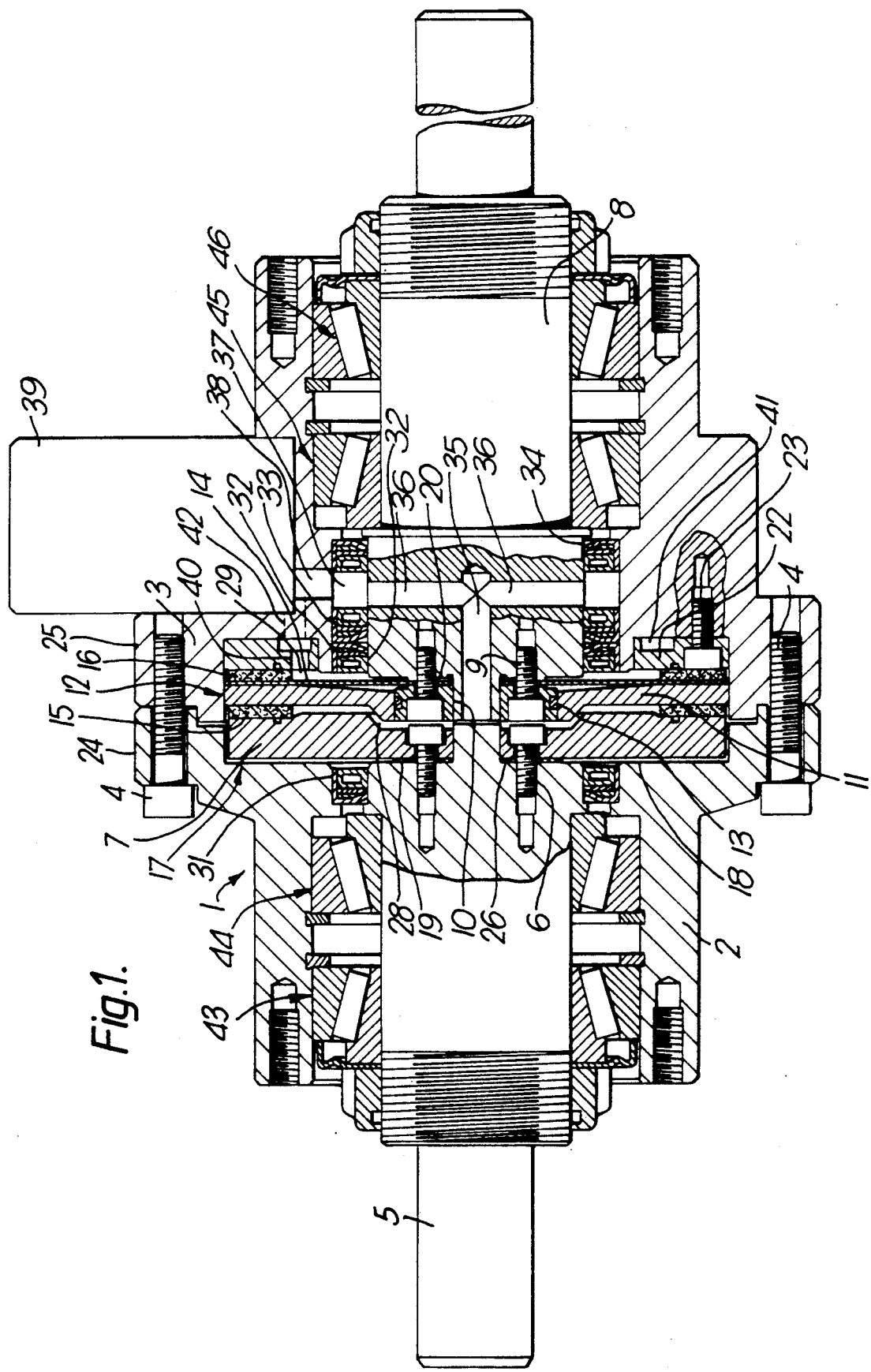

United States Patent [19]

Pedersen

[11] Patent Number: 5,123,508

[45] Date of Patent: Jun. 23, 1992

[54] CLUTCH AND BRAKE ARRANGEMENT SWITCHABLE BY A COMPRESSIBLE FLUID, ESPECIALLY PNEUMATICALLY

[75] Inventor: Svend P. Pedersen, Nordborg, Denmark

[73] Assignee: Danfoss A/S, Nordborg, Denmark

[21] Appl. No.: 678,454

[22] Filed: Apr. 1, 1991

[30] Foreign Application Priority Data

Apr. 28, 1990 [DE] Fed. Rep. of Germany ....... 4013737

[51] Int. Cl.$^5$ ...................... F16D 67/04; F16D 69/00
[52] U.S. Cl. ............... 192/18 A; 192/85 A; 192/107 R
[58] Field of Search ............ 192/18 A, 107 R, 70.14, 192/85 A

[56] References Cited

U.S. PATENT DOCUMENTS

| | | | |
|---|---|---|---|
| 2,054,210 | 9/1936 | Weisenburg | 192/107 R |
| 2,054,872 | 9/1936 | Whisler et al. | 192/107 R |
| 2,481,028 | 9/1949 | Lear | 192/107 R X |
| 2,987,143 | 6/1961 | Culbertson et al. | 192/107 R X |
| 3,166,167 | 1/1965 | Kinsman | 192/18 A |
| 3,750,788 | 8/1973 | Heinemann | 192/107 R |
| 4,901,830 | 2/1990 | Dolby | 192/18 A |
| 4,967,885 | 11/1990 | Arbjerg et al. | 192/18 A |

Primary Examiner—Rodney H. Bonck
Attorney, Agent, or Firm—Wayne B. Easton; Clayton R. Johnson

[57] ABSTRACT

A housing mounts an input shaft with a clutch flange thereon, and an output shaft with an annular friction member thereon to divide the housing clutch chamber into two separate operating chambers. A brake ring has a first friction face facing the friction lining of the friction member while the friction member has a second friction lining facing the clutch flange. The friction member is axially displaceable a limited amounted by a compressible fluid for controlling the movement of the friction linings axially between the linings and into engagement with one of the brake member and the clutch flange. Each of the clutch flange and the brake ring has an annular groove concentric to the coextensive axes of the shafts that opens to the axially adjacent friction lining. The grooves serve to have granular material of the abradable material of the linings, if the linings are made of such material, accumulated therein and have the ribs of the linings that are formed by the abrasion of the linings extend axially thereinto to form a slight throttle gap.

10 Claims, 3 Drawing Sheets

CLUTCH AND BRAKE ARRANGEMENT SWITCHABLE BY A COMPRESSIBLE FLUID, ESPECIALLY PNEUMATICALLY

The invention is concerned with a clutch and brake arrangement switchable by a compressible fluid, especially pneumatically, with an input shaft and an output shaft, which are mounted in a housing and terminate in a clutch chamber, wherein a clutch flange, connected to the input shaft so that the clutch flange and the input shaft rotate together, and a friction disc are arranged in the clutch chamber, the friction disc divides the clutch chamber into two working chambers pressurizable with different pressures and is arranged to engage the clutch flange or an end face of the clutch chamber with a friction lining being inserted therebetween.

In the case of a known clutch and brake of this kind (DE 37 27 173 A1 or corresponding U.S. Pat. No. 4,901,830, or DE 38 24 138 C1 or corresponding U.S. Pat. No. 4,967,885), to effect the non-contact sealing a labyrinth seal is provided between the circumference of the friction disc and the clutch chamber. A large number of circumferential grooves are required for an adequate seal to be achieved in this manner. Moreover, the change-over point of the clutch and brake arrangement with respect to the instant at which a working chamber is pressurized is delayed with increasing abrasion of the friction linings, because the volume of the working chambers and the displacement of the friction disc are increased thereby.

The invention is based on the problem of providing a clutch and brake arrangement of the kind mentioned in the introduction, which allows a simpler kind of sealing and the change-over point of which is largely independent of the abrasion of the friction linings.

According to the invention, that problem is solved in that the face of the clutch flange and/or of the clutch chamber facing the friction surface of the relevant friction lining has an annular groove concentric with the axis of rotation of the shaft.

In that construction, the annular face of the relevant friction lining arranged opposite the annular groove is not abraded, only the friction surface of the friction lining lying outside that annular region. As the friction surface of the friction lining arranged outside the annular region opposite the annular groove is abraded, an axially-projecting annular rib is consequently left on the friction lining; in the disengaged state of the clutch that rib maintains its distance from the edges of the annular groove and in the engaged state of the clutch it engages in the annular groove. In the region of the annular rib and annular groove there is therefore always an adequate seal between the working chamber and the radially-outer side of the friction disc, this seal being independent of the abrasion of the friction surfaces of the friction linings lying outside the annular ribs. For the same reason, the effective volume of the working chambers also remains virtually unchanged, so that the change-over point of the clutch and brake arrangement is also largely independent of the extent of abrasion of the friction linings. It is therefore possible to dispense with the complicated labyrinth seal at the circumference of the friction disc.

The depth of the annular groove should be larger, preferably at least one and a half times larger, than the maximum extent of abrasion of the friction lining. In that connection, the annular groove is able to accommodate abraded particles, so that these do not cause any malfunctioning. At the same time, too great an excess pressure between the annular groove and the annular rib is avoided.

In the case of a granular-form friction lining, the width of the groove should be larger, preferably at least one and a half times larger, than the granule size of the friction lining. This ensures that the width of the annular rib left behind is always larger than one granule and the granules are reliably held in place and the annular rib maintains its shape without disintegrating.

Preferably, the friction lining comprises cork-and-rubber with a granule size of about 1 mm.

It is then possible to provide for the clutch flange and/or the face of the clutch chamber facing the friction lining to have an axially-projecting annular shoulder, which lies with its radially-outer annular face against the radially-inner annular face of the friction lining. In that manner, provision is made for the gap between the facing friction surfaces to be sealed even before the annular rib has formed.

Preferably, provision is made for the annular shoulder to define the annular groove. The annular shoulder then provides for a constant seal even in the event of the friction lining being abraded.

Moreover, close to its radially-inner annular surface the friction lining may have an annular groove concentric with the axis of rotation of the shaft. In that construction, the radially-inner wall defining the annular groove in the friction lining is able expand into this annular groove when it becomes heated owing to the friction between that wall and the annular shoulder, so that the surface pressure between that wall and the annular shoulder, and accordingly the heat of friction, decreases, and the wall contracts again. In that manner, a constant minimum gap width, and accordingly minimum friction between the wall and the annular shoulder, is automatically ensured.

Moreover, provision may be made for the friction disc to have a clutch disc, mounted so as to be axially displaceable with respect to the output shaft in every loaded state, and at least one flexible torque disc, for the torque disc to be non-rotatably and axially immovably arranged on the output shaft and for it to be non-rotatably arranged at the circumference of the clutch disc yet arranged so as to be axially displaceable together with this, and for the torque disc to be pressurized with the same pressure on both sides. In that connection, to change over the friction disc all that is required in a slight pressure sufficient to flex the torque disc. This pressure can be built up correspondingly quickly, so that the change-over delay compared with a one-part and accordingly more rigid friction disc is less. Moreover, the seal of the working chambers is better able to withstand lower pressures.

Figure 2:
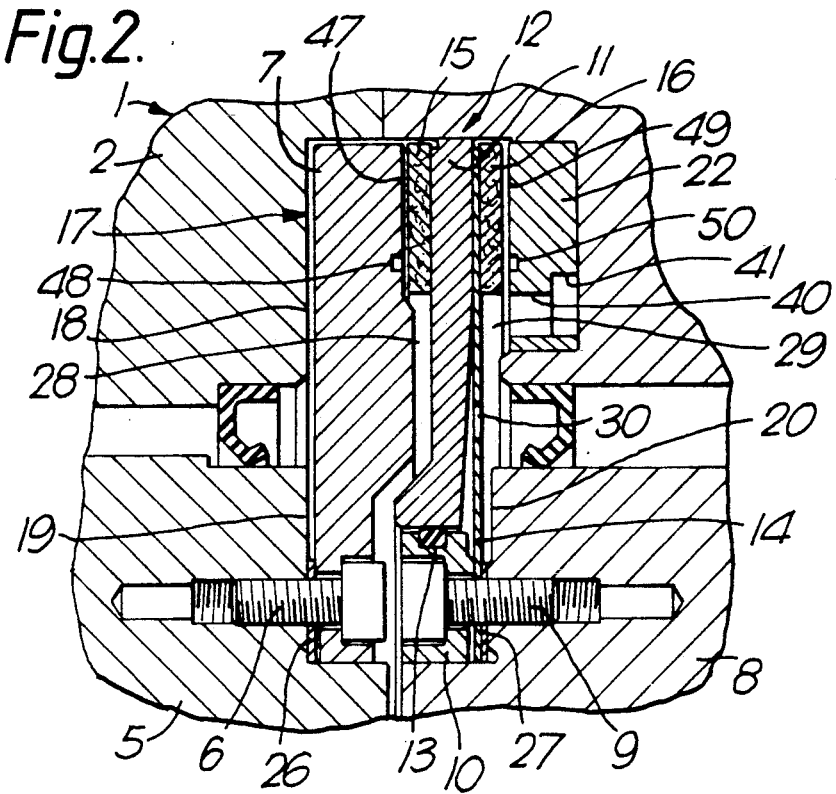
Figure 3:
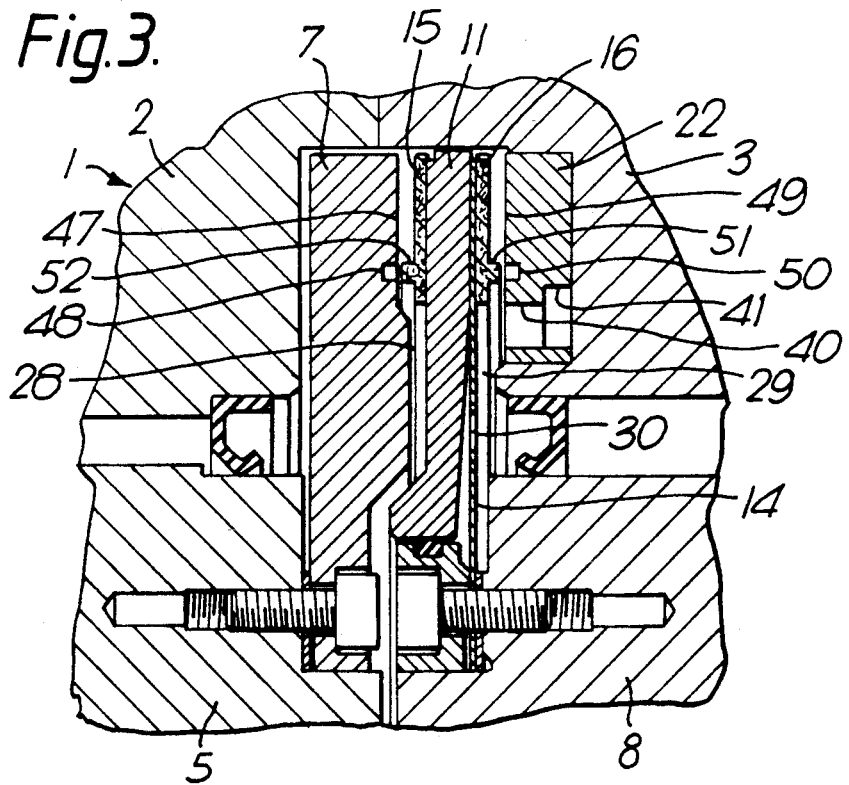
Figure 4:
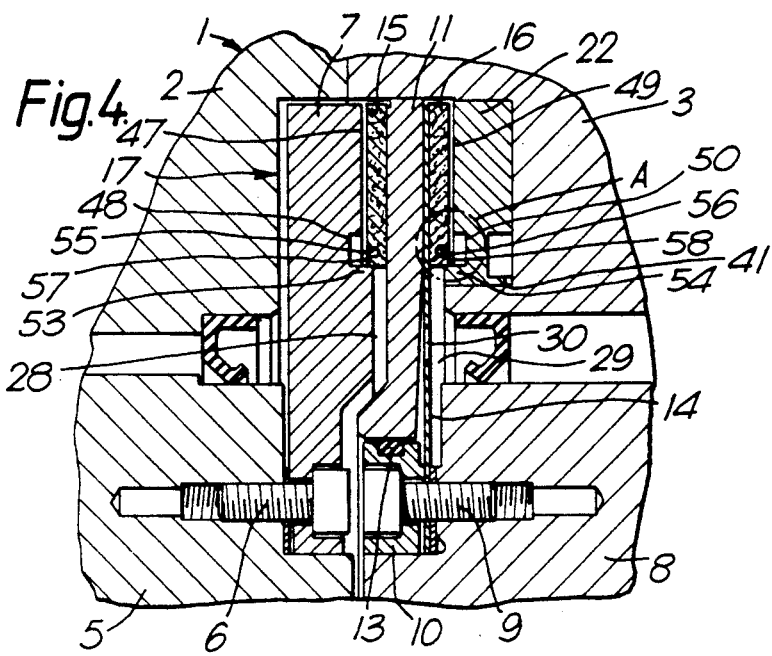
Figure 5:
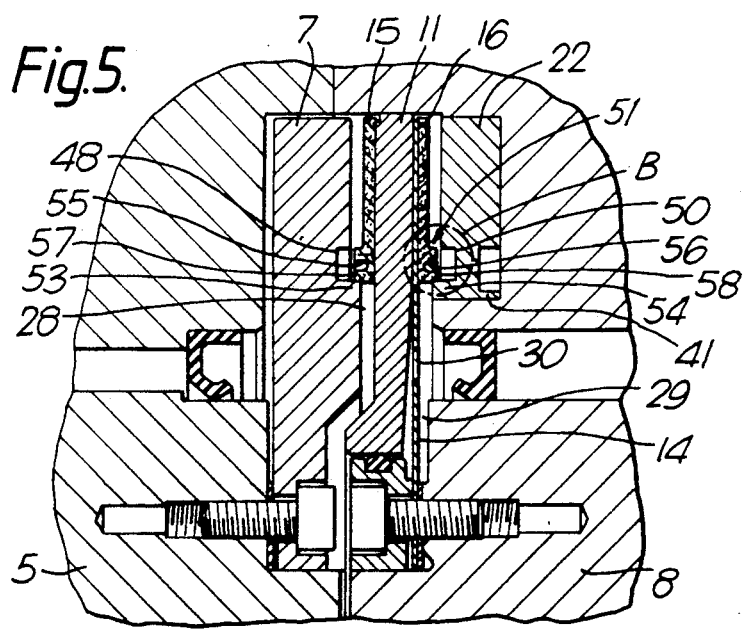
Figure 6:
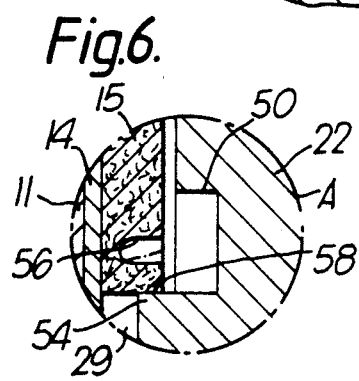
Figure 7:
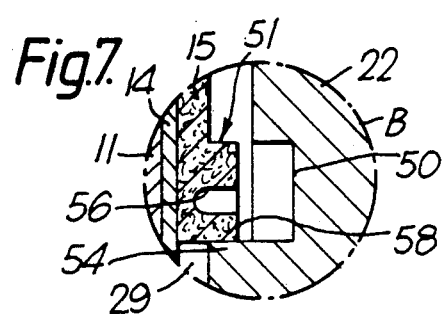

The invention and its developments are described in detail below with reference to the drawings illustrating preferred embodiments; in the drawings, FIG. 1 shows a sectional view of a first embodiment of a clutch and brake arrangement according to the invention, FIG. 2 shows an enlarged detail of the arrangement shown in FIG. 1 before abrasion of the friction linings, FIG. 3 shows the enlarged detail of FIG. 2 after partial abrasion of the friction linings, FIG. 4 shows an enlarged detail of a second embodiment of a clutch and brake arrangement according to the invention before abrasion of the friction linings, FIG. 5 shows the detail of FIG. 4 after partial abrasion of the friction linings, FIG. 6 shows an enlarged detail of the part of FIG. 4 surrounded by the circle designed A and FIG. 7 shows an enlarged detail of FIG. 5.

The clutch and brake arrangement shown in FIG. 1 has a housing 1 comprising two housing parts 2 and 3 which are joined together by screws 4. A driven input shaft 5 is joined by screws 6 to a clutch flange 7 in the shape of an annular disc so that they rotate together. An output shaft 8 is joined by screws 9 to a bearing ring 10 so that the output shaft and the bearing ring rotate together. An annular clutch disc 11 of a friction disc 12 is mounted, so that is it axially displaceable, on the bearing ring 10. The gap between the bearing ring 10 and the clutch disc 11 is sealed by an annular seal 13, in this case an O-ring. The friction disc 12 also has a torque disc 14 which is clamped by the bearing ring 10 to the end face of the output shaft 8, the screws 9 passing also through the torque disc 14. The outer edge region of the torque disc 14 is non-rotatably fixed to the outer edge region of the clutch disc 11. Furthermore, the friction disc 12 is provided on both sides in its axially outer edge regions with friction linings 15 and 16, the friction lining 15 being fixed to the clutch disc 11 and the friction lining 16 being fixed to the torque disc 14. The clutch flange 7 in the shape of an annular disc, the bearing ring 10 and the friction disc 12 are located in a clutch chamber 17, in which the input shaft 5 and the output shaft 8 terminate. The clutch chamber 17 is defined by an end face 18 of the housing part 2, an end face 19 of the input shaft 5, an end face 20 of the output shaft 8, a friction face 49 (FIG. 2) of a brake ring 22 facing the friction lining 16, the brake ring being fixed by means of screws 23 to an end face of the housing part 3, and by circumferential flanges 24 and 25 of the housing parts 2 and 3. Between the end face 19 of the input shaft 5 and the clutch flange 7 there is a washer 26 (FIG. 2) to maintain a space between the clutch flange 7 and the end face 18 of the housing part 2. There is also a washer 27 (FIG. 2) between the end face 20 of the output shaft 8 and the torque disc 14.

The friction disc 12 divides the clutch chamber 17 into two working chambers 28 and 29, the part of the working chamber 29 lying on the one side of the torque disc 14 being connected to the part of the working chamber 29 lying on the other side of the torque disc 14 by at least one hole 30 (FIG. 2) formed in the torque disc 14.

A seal 31 is arranged between the input shaft 5 and a stepped bore in the housing part 2 receiving the shaft. Furthermore, several seals 32, 33 and 34 are arranged between the output shaft 8 and a stepped bore in the housing part 3 receiving the output shaft 8.

The working chamber 28 is connected by way of channels 35 and 36 in the output shaft 8 to an annular chamber 37 between the seals 33 and 34, the annular chamber in its turn being connected by way of a channel 38 in the housing part 3 and by way of an electromagnetically operable valve 39 to a source of pressure, not illustrated.

The working chamber 29 is connected by way of an axial channel 40 and an annular channel 41 in the brake ring 22 and also by way of a channel 42 in the housing part 3 and a further electromagnetically operable valve, not illustrated, to the source of pressure.

The input shaft 5 and the output shaft 8 are rotatably mounted in the housing bores by means of roller bearings 43, 44, 45 and 46.

As more clearly shown in FIGS. 2 and 3, an annular groove 48 concentric with the axis of rotation of the shaft is formed in the face 47 of the clutch flange 7 facing the friction surface of the friction lining 15, and a further annular groove 50 concentric with the axis of rotation of the shaft is formed in the face 49 of the clutch chamber 17, or the brake ring 22 defining it, facing the friction lining 16. The depth of the annular grooves 48 and 50 is larger, preferably at least one and a half times larger, than the maximum extent of abrasion of the friction linings 15 and 16. When granular-form friction linings 15 and 16 are used, the width of the annular grooves is larger, preferably at least one and a half times larger, than the granule size of the friction linings 15 and 16, the friction linings 15 and 16 preferably comprising cork-and-rubber with a granule size of 1 mm.

To couple the input shaft 5 with the output shaft 8, by opening the valve that is not illustrated compressed air is conveyed through the channel 42, the annular channel 41 and the channel 40 to the working chamber 29, and the working chamber 28 is connected by way of the channels 35, 36, the annular chamber 37 and the channel 38 as well as the valve 39 to the atmosphere, the valve 39 separating the connection to the source of pressure and connecting the channel 38 to the atmosphere. Because of the narrow gaps between the friction linings 15 and 16 on the one hand and the faces 47 and 49 facing them on the other hand, the pressure in the working chamber 29 rises compared with the pressure in the working chamber 28, so that the clutch disc 11, with the torque disc 14 being flexed, is axially displaced until the friction lining 15 comes into frictional engagement with the face 47 of the clutch flange 7. The clutch flange 7 rotating together with the input shaft 5 carries the output shaft 8 with it by way of the friction disc 12, that is, by way of the friction lining 15, the clutch disc 11, the torque disc 14 and the screws 9. Conversely, disengagement of the output shaft 8 from the input shaft 5 with simultaneous braking of the output shaft 8 is effected by corresponding change-over of the valves, the pressure in the working chamber 28 increasing with respect to the pressure in the working chamber 29 and the clutch disc 11, with the torque disc 14 being flexed, being axially displaced until the friction lining 16 engages the face 49 of the brake ring 22, so that the frictional connection between the friction lining 15 and the face 47 of the clutch flange 7 is separated and the rotation of the output shaft 8 is braked by the friction of the friction lining 16 on the brake ring 22.

After repeated engagement and disengagement or braking of the output shaft 8, the friction linings 15 and 16 are abraded more and more, but only in a region lying radially inside and outside the annular grooves 48 and 50, while the regions of the friction surfaces of the friction linings 15 and 16 facing the annular grooves 48 and 50 are not abraded, so that axially-projecting ribs 51 and 52 remain behind in these unabraded annular regions, as illustrated in FIG. 3. Despite the abrasion of the friction linings 15 and 16, these ribs 51 and 52 continue to ensure a slight throttle gap between the friction linings 15 and 16 and the faces 47 and 49 facing them, so that the working chambers 28 and 29 remain adequately sealed. Since the depth of the annular grooves 48 and 50 is selected to be greater than the maximum extent of abrasion of the friction linings 15 and 16, abraded particles are able to accumulate at least partially in the respective annular chamber between the rib 52 and the base of the annular groove 48 and between the rib 51 and the base of the annular grove 50, without operation being impaired. Choosing the width of the annular grooves 48 and 50 so that it is larger than the granule size of the friction linings 15 and 16 ensures that the ribs 51 and 52 are sufficiently strong and do not disintegrate.

In the modification of the clutch and brake arrangement shown in FIGS. 4 to 7, the annular grooves 48 and 50 are of somewhat wider construction and the clutch flange 7 and the face 49 of the clutch chamber 17, or the brake ring 22, facing the friction lining 16, are each provided with an axially-projecting annular shoulder 53 and 54; with their radially-outer annular face the shoulders engage the radially-inner annular face of the respective friction lining 15 and 16, the annular shoulder 53 defining the annular groove 48 and the annular shoulder 54 defining the annular groove 50.

Furthermore, in each friction lining 15 and 16 close to its radially-inner annular face there is formed a respective annular groove 55 and 56 concentric with the rotational axis of the shaft. The annular grooves 55 and 56 are in that manner each defined by respective radially-inner circumferential walls 57 and 58.

The annular shoulders 53 and 54 lying at the radially-inner annular faces of the friction linings 15 and 16 additionally provide a seal for the working chambers 28 and 29. The annular grooves 55 and 56 provide a clearance into which the walls 57 and 58 are able to expand as a result of being heated by the friction at the annular shoulder 54, as indicated by the broken lines in FIG. 6. This is further favoured in that the clutch flange 7 and the brake ring 22 are manufactured from steel and the friction linings 15 and 16 are manufactured from cork and rubber, the friction linings having a coefficient of thermal expansion about ten times higher than that of the clutch flange 7 and the brake ring 22. The result of this is that a constant throttle gap independent of the heating is automatically maintained between the annular shoulder 53 and the wall 57 and between the annular shoulder 54 and the wall 58. In addition, a very narrow gap with a throttling function is provided between the outer circumferential face of the clutch disc 11 and the inner circumferential face of the clutch chamber 17, as in the embodiment shown in FIGS. 1 to 3.

I claim:

1. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, an annular friction clutch member mounted to the output shaft adjacent end in limited axially movable relationship to the output shaft to at least in part subdivide the clutch chamber into two operating chambers that are adapted to be at different fluid pressures and arranged to engage one of the clutch flange and one of the first and second end walls of the clutch chamber, and a first frictional lining disposed axially between the friction member and one of clutch flange and the first end wall and mounted to one of the friction member and the clutch flange and having a radial extending face axially opposite the one of the friction member and the clutch flange to which it is mounted, the other of the friction member and the clutch flange to which the friction lining is mounted having an annular groove concentric to said axes that opens axially to the lining face, the friction lining being abradable and having a maximum axial abradable dimension and the annular groove being of an axial depth that is at least larger than the maximum axial dimension of abrasion of the lining.

2. Apparatus according to claim 1, characterized in that the output shaft has various loaded states, that the friction member includes a clutch disc axially displaceable with respect to the output shaft in various loaded states and at least one flexible torque disc having a radial inner portion in axial fixed and circumferentially fixed relationship to the output shaft, each of the clutch disc and torque disc having a radial outer portion in fixed circumferential relationship to one another, the torque disc having axially opposite side portions, the friction member having means for retaining the opposite side portions at the same fluid pressure.

3. A clutch and brake apparatus operable by compressible fluid, comprising a housing having wall means that at least in part define a clutch chamber and includes axially opposite first and second end walls and a circumferential wall extending between the first and second end walls, a brake ring mounted to the second end wall, an output shaft having various loaded conditions, an input shaft, means mounted by the housing for mounting the shafts for rotation about coextensive rotary axes, the input and output shafts having adjacent first ends, a clutch flange mounted to the input shaft adjacent end to rotate therewith, a first friction member disposed in the clutch chamber and adjacent to the output shaft adjacent end in slightly axially movable relationship to the output shaft in various load conditions and to at least in part subdivide the clutch chamber into two operating chambers that are adapted to be at different pressures, a first friction lining disposed axially between the friction member and the clutch flange and a second friction lining mounted to the friction member axially between the friction member and the brake ring, one of the friction member and clutch flange mounting the first friction lining for engagement with the other, the first friction member having axially opposite first and second sides, at least one of the first friction lining and the clutch flange having a first annular groove opening axially toward the other, and one of the second friction lining, and the second end wall and the brake ring having a second annular groove opening axially toward the other, the clutch flange having the first groove, one of the second end wall and the brake ring having the second groove and each of the first and second friction lining comprising abradable material to form a first and a second annular, axially projecting rib extendable into the first and second groove respectively for forming slight throttle gaps as the linings are abraded.

4. Apparatus according to claim 3, characterized in that the abraded material from the first and second friction linings being accumulatable in the respective adjacent groove.

5. A clutch and brake apparatus operable by compressible fluid, comprising a housing having wall means that at least in part define a clutch chamber and includes axially opposite first and second end walls, and output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, an annular friction clutch member mounted to the output shaft adjacent end in limited axially movable relationship to the output shaft adjacent end in limited axially movable relationship to the output shaft to at least in part subdivide the clutch chamber into two operating chambers that are adapted to be at different fluid pressures and arranged to engage one of the clutch flange and one of the first and second end walls of the clutch chamber, and a first frictional lining disposed axially between the friction member and one of clutch flange and the first end wall and mounted to one of the friction member and the clutch flange and having a radial extending face axially opposite the one of the friction member and the clutch flange to which it is mounted, the other of the friction member and the clutch flange to which the friction lining is mounted having an annular groove concentric to said axes that opens axially to the lining face, the friction lining being made of granular material, and the annular groove being of a radial dimension larger than the granular size of the granular material.

6. Apparatus according to claim 5, wherein the friction lining comprises cork-and-rubber having a granule size of about 1 mm.

7. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange in the clutch chamber and mounted to the input shaft adjacent end to rotate therewith, an annular friction clutch member mounted to the output shaft adjacent end in limited axially movable relationship to the output shaft to at least in part subdivide the clutch chamber into two operating chambers that are adapted to be at different fluid pressures and arranged to engage one of the clutch flange and one of the first and second end walls of the clutch chamber, and a first frictional lining disposed axially between the friction member and one of the clutch flange and the first end wall and mounted to one of the friction member and the clutch flange and having a radial extending face axially opposite the one of the friction member and the clutch flange to which it is mounted, the other of the friction member and the clutch flange to which the friction lining is mounted having an annular groove concentric to said axes that opens axially to the lining face, the friction lining having a radially inner annular face and the one of the clutch flange and the end wall facing the friction lining having an axially projecting annular shoulder that has a radial outer face engaging the radially inner annular face.

8. Apparatus according to claim 7, characterized in that the annular shoulder defines the annular groove.

9. Apparatus according to claim 7, characterized in that the friction lining has an annular groove concentric to the rotary axes, the lining groove being closely adjacent to the annular shoulder.

10. Apparatus according to claim 7, characterized in that the friction member has a side axially opposite the first friction lining, and that there is provided a second friction lining mounted to the friction member on its side axially opposite the first friction member, that the first friction member comprises an abradable member that, as abraded, forms an axially projecting rib extendable into said groove to form a slight throttle gap, and that the second end wall at least in part includes a brake ring surface.

* * * * *